July 5, 1966    G. R. MARR, JR    3,259,734
COMPUTER CONTROL OF EXTERNAL REFLUX TO A FRACTIONATING COLUMN
Filed Jan. 2, 1963
FIG. 1
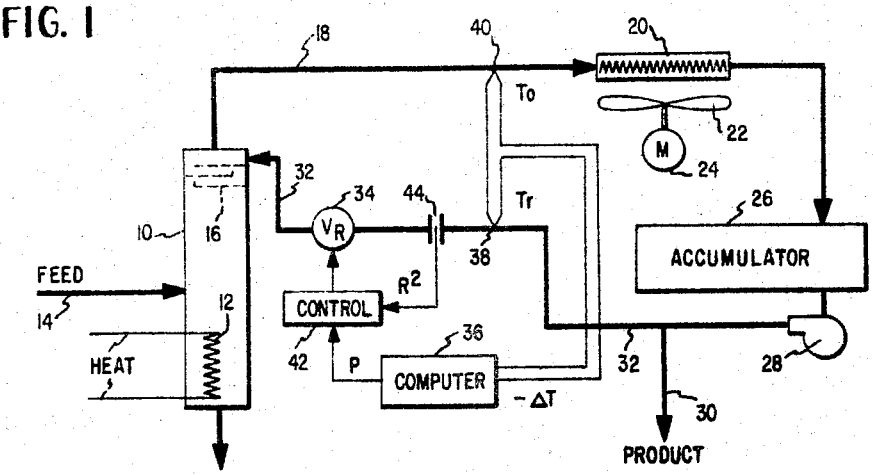
FIG. 2
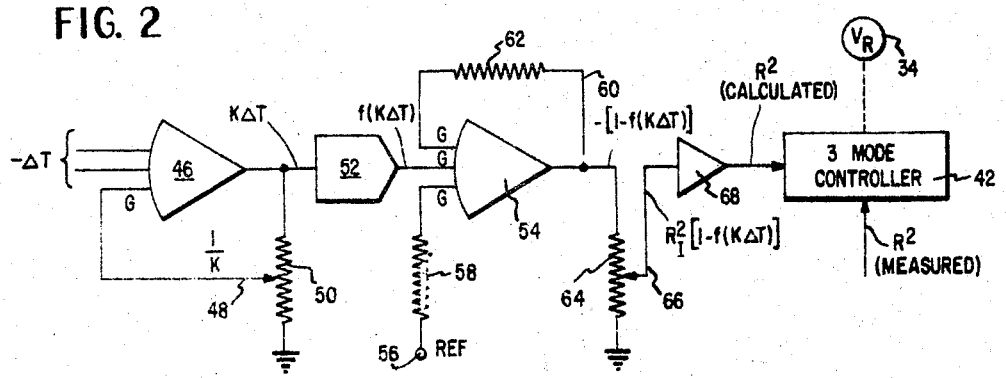
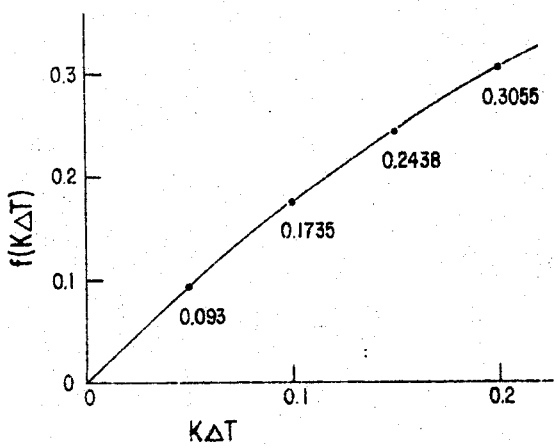
FIG. 3
INVENTOR.
GEORGE R. MARR, JR.
BY
*Sughrue, Rothwell, Mion & Zinn*
ATTORNEYS

3,259,734
COMPUTER CONTROL OF EXTERNAL REFLUX TO A FRACTIONATING COLUMN
George R. Marr, Jr., Princeton Junction, N.J., assignor to Electronic Associates Inc., Long Branch, N.J., a corporation of New Jersey
Filed Jan. 2, 1963, Ser. No. 249,069
3 Claims. (Cl. 235—151.35)

This invention relates to improvements in control computers of the analog type and more particularly to an analog computer for controlling the flow of external reflux to a fractionating column in order to stabilize the operation of the column by indirectly maintaining a constant flow of internal reflux.

It is well known in the art that the performance of fractionating columns is severely affected by disturbances in reflux condensing auxiliaries. When air fan coolers are used for reflux condensation changing ambient conditions impose severe load changes on the reflux temperature control system. And air fan coolers have found increasing use in recent years for condensing overhead fractions, particularly in areas where cooling water is scarce and water handling facilities are expensive. Due to this problem, a satisfactory system of stabilizing and controlling fractional distillation columns under rapidly changing ambient temperature conditions has been the subject of considerable attention.

In one of the known systems for controlling distillation reflux, an analog computer is used to control the external reflux applied to the column to give a constant internal reflux. The external reflux flow rate is controlled by the analog computer in response to the temperature differences which may exist between the external reflux and overhead vapor to maintain constant the internal reflux flow rate.

The prior known computers for accomplishing control of the distillation reflux are based on a simple heat and material balance at the top tray of the distillation column and this heat and material balance is based on the fact that the internal reflux equals the external reflux plus the amount of overhead vapor that condenses.

In the known prior analog computers for controlling the external reflux, the external reflux is measured by a mass flow rate meter and an electrical signal representative thereof is proportional to the square of the external reflux rate. In order to insert this into a heat and material balance equation for solution, a complicated and somewhat expensive logarithmic square root taking operation and multiplication circuits must be utilized to obtain the square root of the external reflux rate squared and then multiply by other parameters.

It is, therefore, an object of this invention to provide an analog computer capable of controlling the application of external reflux to a fractional distillation column accomplished by relatively direct method using inexpensive and uncomplicated computer components.

It is a further object of this invention to provide an analog process control computer circuit which is more accurate than prior circuits while at the same time being less expensive.

It is an additional object of this invention to provide a circuit for a process control computer which is more reliable than known prior computer circuits for the same general purpose.

The foregoing and other objects, features and advantages of the invention will be apparent from the following more particular description of the best mode contemplated of practicing the invention, as illustrated in the accompanying drawings.

In the drawings:
FIGURE 1 is a diagrammatic representation of a typical distillation column utilizing a control computer to control the application of external reflux in accordance with the preferred embodiment of this invention;
FIGURE 2 is a schematic logical diagram of the computer control of this invention; and
FIGURE 3 is a graphical representation of $f(K\Delta T)$ plotted as a function of $K\Delta T$ in the equation utilized by the computer of this invention.

As discussed above, the basis for computer control of distillation reflux is from a material balance equation in which internal reflux equals external reflux plus the amount of overhead vapor that condenses. With varying ambient conditions and with an air fan condenser the amount of overhead vapor that condenses is liable to vary quite widely with the ambient conditions. The equation for the above material balance can be written as follows:

$$R_I = R\left[1 + \frac{C_p}{\lambda}(T_o - T_r)\right] \quad (1)$$

where $T_o$ equals the temperature of the overhead vapor and $T_r$ equals the temperature of the external reflux, $R_I$ equals the internal reflux and $R$ equals the external reflux. $C_p$ is the specific heat of the external reflux. $\lambda$ is the heat of vaporization of the overhead vapor. $\Delta$ is equal to the difference between the temperature of the overhead vapor and the temperature of the external reflux. Knowing the composition of the overhead vapor and external reflux, $C_p/\lambda$ equals to constant (K). Thus, the Equation 1 making the substitutions of equivalents noted above becomes the equation:

$$R_I = R[1 + K\Delta T] \quad (2)$$

The typical known prior art computer solves for $R_I$ in the above Equation 2; see, for example, "Computer Control of Distillation Reflux," ISA Journal, vol. 6, No. 6 (1959). However, the external reflux R is actually measured by a mass flow meter as an electrical signal equal to $R^2$ and thus it is necessary to take a square root and multiply in the equations causing the computer to utilize more components and more steps in the operation, thus more possibility of computer error than would be the case using the present invention.

In the present invention, the basic material balance Formula 2 above is arbitrarily squared to get the following formula:

$$R_I^2 = R^2(1 + K\Delta T)^2 \quad (3)$$

If by definition $R_I^2$ equals $P_I$ and $R^2$ equals $P$, the Formula 3 becomes:

$$P_I = P(1 + K\Delta T)^2 \quad (4)$$

In Equation 4 P is the external reflux squared and is proportional to the signal obtained from a flow meter in the external reflux line.

P and $P_I$ are composed of two parts, namely, a steady state and a deviation or change from steady state. Or, expressed mathematically:

$$P = P_S + \Delta P \quad (5)$$
$$P_I = P_{IS} + \Delta P_I \quad (6)$$

Substituting Equations 5 and 6 into Equation 4 gives:

$$P_{IS} + \Delta P_I = P_S + 2P_S(1 + \frac{1}{2}K\Delta T)(K\Delta T) + \Delta P(1 + K\Delta T)^2 \quad (7)$$

Assuming as a basis for reasoning that $P_{IS}$ equals $P_S$ so that these terms cancel from Equation 7 and that we desire to have $P_I$ equal $P_{IS}$ (i.e., $\Delta P_I = 0$ is desired) there remains in the Equation 7.

$$\Delta P = -2P_S(K\Delta T)[1 + \frac{1}{2}(K\Delta T)](1 + K\Delta T)^{-2} \quad (8)$$

Substituting the Equation 5 and the value of $\Delta P$ in Equation 8 we obtain:

$$P = P_S + \Delta P = P_E \left[ 1 - \frac{2(K\Delta T)(1+1/2K\Delta T)}{(1+K\Delta T)^2} \right] \quad (9)$$

Noting that $P_S = P_{IS} = R_{IS}^2$; Equation 9 can be written:

$$P = R_{IS}^2 [1 - f(K\Delta T)] \quad (10)$$

where $f(K\Delta T)$ is the complicated ratio $$\frac{2(K\Delta T)(1+1/2K\Delta T)}{(1+K\Delta T)^2}$$

of Equation 9.

The computer of this invention solves Equation 10 and utilizes the results to control distillation reflux.

The benefit of solving Equation 10 relative to the normal equations such as Equation 2 solved for in this type of computer control, control distillation reflux of Equation 2 is that the implied program can be accomplished with less computer error and yet utilizes less expensive computer components.

Referring to FIGURE 1, there is shown schematically a typical fractionation or fractional distillation column 10 which is to be stabilized by improving the control of the column reflux according to the computer of this invention. The column 10 is supplied with heat at constant rate by a suitable heat source 12. A flow of product to be fractionated or fed is introduced to system input 14 and the overhead vapor, the composition of which is to be controlled, is distilled off a top tray 16 of column through an overhead outlet line 18.

A suitable air-cooled condenser 20 is in the overhead line and is cooled by a fan 22 driven by motor 24. An accumulator 26 is provided for accumulating the condensed overhead product reflux. The accumulated liquid overhead is extracted from the reflux accumulator by a suitable pump 28 and delivered either to an output product line 30 or to an external reflux conduit 32 for recycle of the reflux. The external reflux to be recycled to the top tray of the fractionating column flows through conduit 32 and into the top tray under the control of a regulating valve 34. That is, valve 34, which may be electrically operated under control of the computer of this invention, is disposed in the conduit to regulate the mass rate of flow of external reflux being introduced into the column 10.

For controlling the regulating valve 34 to in turn control the external reflux, a control computer 36 is provided. The temperature of the overhead $T_o$ and the temperature of the reflux $T_r$ may be sensed by suitable thermocouples 38 and 40 to provide an electrical signal equal to the difference in temperature ($\Delta T$) as an input to the computer 36. The output of the computer 36 which is equal to P in Equation 10 is fed to a three-mode controller 42. A mass flow meter 44 in line 32 measures the flow of the external reflux in front of regulating valve 34 and applies an electrical signal to the square of the external reflux flow, $R^2$ in the equations discussed below, to the three-mode controller for comparing and the output of the comparison of the three-mode controller 42 is used to regulate valve 34. The three-mode controller can be of the type shown, for example, in Patent 2,946,943, Nye et al., granted July 26, 1960. Such a controller includes parallel proportional, derivative and integral sections.

A circuit to solve Equation 10 and solve for P, therefore, the circuit of the computer 36 in FIGURE 1, is shown diagrammatically in FIGURE 2. The circuit includes a thermocouple amplifier 46 to which the signal provided by the bucking thermocouples as $-\Delta T$ is applied. The fraction $1/K$ is divided into $-\Delta T$ feed back around amplifier 46 using the selection of a suitable potential for a wiper 48 on grounded potentiometer 50 to supply $1/K$. Thus, the product of the multiplication of the constant coefficient K times $\Delta T$ is performed by the sign changing amplifier.

The product of $K\Delta T$ is applied to a diode function generator 52 which is a comparatively simple variable function generator of a commercially available type constructed for generating a function $f(K\Delta T)$ in accordance with the expression $$\frac{2(K\Delta T)(1+\tfrac{1}{2}K\Delta T)}{(1+K\Delta T)^2}$$

in Equation 9 noted above. A plot of this function is illustrated in FIGURE 3. For inserting the 1 in Equation 10 plus subtraction of $f(K\Delta T)$ therefrom, the output of the function generator 52, $f(K\Delta T)$ is applied to the grid of an operational amplifier 54; also applied to the grid of operational amplifier 54 is a reference voltage from reference 56 through potentiometer 58. A feedback loop 60 with resistance 62 is also applied to the grid of the amplifier to obtain the output of $-(1-f(K\Delta T))$. This is multiplied by $-R_1^2$, which is the desired internal reflux rate squared, by means of a multiplier which may take the shape of a grounded potentiometer 64 with a wiper 66 set to correspond to the desired $R_1^2$. The resultant product, which is the same as Equation 10 noted above, is equal to $R^2$ or P. This is amplified by an ordinary amplifier 68 and the output of ordinary amplifier 68 forms one of the inputs to the three-mode controller 42. The other input to the three-mode controller 42 is the measured mass flow rate signal equal to $R^2$ measured at the mass flow meter 44. The two signals, one the computed $R^2$ and the other the measured $R^2$ are compared and the three-mode controller controls the valve 34 accordingly.

It can be seen that the subject invention provides an effective stabilization and control of a fractionator by controlling the application of reflux to the top tray of a fractionating column utilizing a simple computer control which accomplishes the control with less computer error and yet uses less computing components than the prior known control computers of this type.

It should also be pointed out that the circuit has the potential of being more reliable than previous circuits. For example, the thermocouples generating the $\Delta T$ signal, the thermocouple amplifier, and/or the function generator can fail (give zero output) and yet the computer will provide a useful output, namely $R^2 = R_I$.

While the invention has been particularly shown and described with reference to a preferred embodiment thereof, it will be understood by those skilled in the art that various changes in form and details may be made therein without departing from the spirit and scope of the invention, as defined in the appended claims.

What is claimed is:

1. A computer for controlling the application of external reflux to a distillation column, the computer comprising; means for sensing the temperature difference between overhead reflux streams of the distillation column and applying the said temperature difference as an electrical signal to the computer, means for multiplying the temperature difference signal by an electrical signal representing a predetermined constant, function generator means for generating a signal representing a function of said constant times said temperature difference, means for subtracting said last-named signal from numerical 1, and means for multiplying the result of the subtraction operation by the square of the desired internal reflux mass flow rate to obtain the square of the external reflux flow rate which would be required to provide the desired internal reflux flow rate.

2. A comuputer as defined in claim 1 further comprising means for comparing the square of the desired external reflux flow rate with the actual square of the external flow rate and utilizing the output of such comparison to control a regulating valve for the external reflux.

3. An electrical analog control computer for use in a control system for stabilizing the operation of a fractionating column by indirectly maintaining a constant flow of internal reflux by controlling the flow of external reflux, the control computer comprising; means for sensing the temperature differential between an overhead line from the fractionating column and the external reflux line and applying the said temperature differential as an electrical signal to the computer, means for multiplying the temperature differential signal by an electrical signal representing a predetermined constant, an electrical function generator means for generating a signal representing a function of the constant times the temperature difference, electrical circuit means for subtracting the electrical signal corresponding to the function of the constant times the temperature difference from an electrical signal representing numerical 1, electrical circuit means for multiplying the result of said subtraction by an electrical signal representing the desired internal reflux flow rate squared, means for comparing the result of said last recited multiplication operation with a measured rate of external reflux flow squared, and means for utilizing the result of said comparison to control a regulating valve for said external reflux.

References Cited by the Examiner

UNITED STATES PATENTS

| 3,018,229 | 1/1962 | Morgan. | |
|---|---|---|---|
| 3,107,293 | 10/1963 | Tolin | 235—151 |
| 3,139,391 | 6/1964 | Walker | 235—151 X |
| 3,143,643 | 8/1964 | Fluegel et al. | 235—151 X |
| 3,177,125 | 4/1965 | Berger | 235—151 X |

MALCOLM A. MORRISON, *Primary Examiner.*

I. KESCHNER, *Assistant Examiner.*